May 21, 1963 H. H. SCHULZE 3,090,388
SNAPPING BARS FOR CORN PICKER SNAPPING ROLLS
Filed April 25, 1961
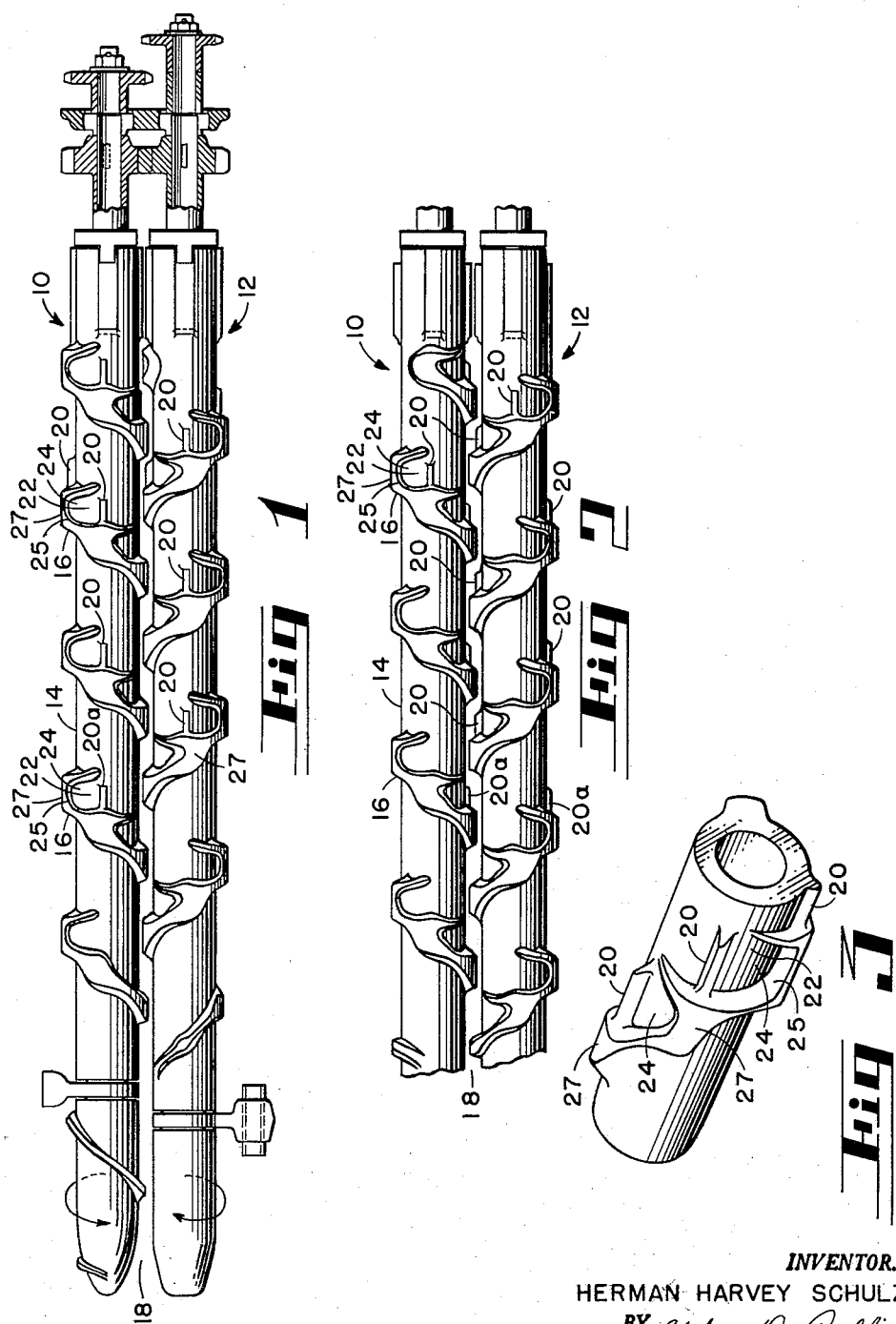
INVENTOR.
HERMAN HARVEY SCHULZE.
BY
ATTORNEYS.

United States Patent Office 3,090,388
Patented May 21, 1963

3,090,388
SNAPPING BARS FOR CORN PICKER SNAPPING ROLLS
Herman Harvey Schulze, Coldwater, Ohio, assignor to Avco Corporation, Coldwater, Ohio, a corporation of Delaware
Filed Apr. 25, 1961, Ser. No. 105,421
5 Claims. (Cl. 130—5)

This invention relates to snapping bars for corn picker snapping rolls and the resulting improvement in the operation of the rolls, enabling them to operate with less tendency to clog while improving the efficiency of operation in snapping the ears from the stalks.

It is a principal object of the invention to provide projecting elements, so-called bars, on the surface of the rolls, so positioned relative to other projecting spirally-positioned rib patterns on the rolls and the snapping pockets and the lobes thereof, so arranged that the husks and stalks and other material will be effectively carried between the rolls and discharged to the ground while providing for effective snapping of the ears from the stalk.

It is a further object of the invention to provide projecting bars on the surfaces of the rolls positioned in front of certain of the snapping pockets of rib pattern on the rolls so that effective handling of stalk material is made possible, and particularly in the region ahead of the open side of the snapping pockets, thereby to improve the grip of the roll on the shank of an ear of corn thereby to sever such ear from its stalk in a more positive and efficient manner.

It is another object of the invention to provide radially projecting bars on the rolls adjacent the spiral rib pattern ahead of certain snapping pockets along the longitudinal length of the snapping rolls, bars of less radial projecting height being provided at the lower portion of the rolls which first contact the stalks and the bars of greater radial projecting height being provided in the upper region of the rolls.

It is a further object to provide for varying effectiveness of the projecting bars by providing projecting bars along and adjacent the spiral rib pattern and snapping pockets of the rolls with a greater spiral spacing between the bars in the lower region of the rolls, while the bars in the upper region of the rolls are provided with more frequency and with less spacing therebetween.

The above and other objects of the invention will appear more fully from the following more detailed description and by reference to the accompanying drawings forming a part hereof and wherein:

FIG. 1 is a plan view showing a pair of adjacent snapping rolls in substantially the relation they occupy when installed on a corn picker. The rolls are shown in the figure as viewed from above.

FIG. 2 is a plan view like FIG. 1, but shows a portion of the two rolls rotated 90 degrees in their operating direction of rotation.

FIG. 3 is a perspective view of a short section of one of the snapping rolls showing the relation of the snapping bars to other parts of the roll.

In the drawings, the reference character 10 indicates one of the snapping rolls of the corn picker and the reference numeral 12 indicates the coacting roll. Each of these rolls has a substantially cylindrical body portion 14 and a spirally arranged integral upstanding rib pattern 16. The rolls 10 and 12 are mounted on a corn picker in such manner that the rolls at their lower ends 18 are carried in such position along a corn row as to receive stalks of corn at the lower ends 18 thereof between the two rotating rolls. Further details of mechanism for driving the rolls in rotation and their relation to other parts of a corn picker are disclosed in U.S. Patent 2,763,-976, FIGS. 9, 11 and 12.

The rib patterns 16 are arranged with opposite pitch on the rolls 10 and 12 so that when the rolls are turned by suitable power means, in the directions indicated by the arrows in FIG. 1, the spiral rib pattern on one roll runs continuously in the space between two convolutions of the similar rib on the coacting roll. Spaced in the spiral rib pattern of each roll at substantially 90 degree intervals, so-called snapping pockets 24 are provided, affording a rib pattern configuration of substantially U-shaped form with the open side 22 of the U toward the direction of rotation. The bottom 25 of the snapping pocket is adjacent a circumferentially-extending portion of the projecting rib pattern and such portion adjacent the bottom of the pocket is known as a lobe, here designated by the numeral 27.

With varying conditions existing in the field, difficulties related to stoppage of the rolls caused by failure of the rolls to adequately move the stalks, or other material which may be encountered, through the rolls is and always has been a major problem in snapping roll operation. Such stoppage during the picking operation is often a cause of delay and sometimes requires that the operator remove the obstruction before the picking operation can continue.

According to the present invention, a series of additional projections, called snapping bars 20, are located opposite the open side 22 of certain of snapping pockets 24 and are preferably integral with and project from the surface of rolls 10 and 12. Each of the snapping bars 20 are longitudinally extending relative to the length of the rolls, i.e., substantially at right angles to the direction of rotation of the rolls 10 and 12. These snapping bars 20 are a part of the spirally-positioned rib patterns 16 and coact with the snapping pockets 24 serving to contact material such as stalks, or sometimes weeds, ahead of the snapping pocket and to more positively grip the shanks to which the ears of corn are attached in such relation that there is a positive pull when ear snapping from the stalks is to be accomplished by contact of the base, or shank, of the ear with the snapping pocket 24. The height of the snapping bars 20 radially of the rolls varies as will later be described, but it is also a preferred construction that such bars are of less height from the surface of the rolls than is the height of the adjacent rib pattern and the corresponding lobe 27 of the adjacent snapping pocket 24. Snapping action is accomplished by the rotation of the rolls in the direction of the arrows shown in FIG. 1 and the snapping bars assure a more positive and well-defined movement of stalk material and a more positive positioning of the ears for snapping from the stalk by accomplishing a more positive contact with the snapping pockets.

In order to further improve the efficiency of movement of the stalk and the separation of the stalks from the ears during the travel through the rolls, it has also been found to be advantageous to progressively vary the height of the bars 20 from the lower end 18 upwardly of each roll. The height of the bars 20a to 20 increases from the lower region to the region higher on the rolls where it is desired to assure a more definite snapping of ears and where a more serious problem of stoppage occurs. It has also been found advantageous to provide a greater number of bars in the upper region of the rolls than in the lower region where the bars 20a are provided. It has been found generally sufficient to provide these bars on alternate snapping pockets in the lower region, while in the upper region where the bars 20 are used, a bar opposite each snapping pocket or an angular spacing of 90 degrees is preferred. The bars 20 thus occur with greater frequency in the upper regions of the rolls.

In operation, as the pair of rolls 10 and 12 are mounted for rotation on a corn picker and carried in an inclined position in relation to a corn row, as straddling such row, and the stalks of corn enter between the lower ends 18 of the rolls 10, 12 which are carried in an inclined position along a row of corn. The counter-rotating rolls 10, 12 with their spiral rib patterns 16 carry the stalks through and between the rolls downwardly through the rolls and upwardly on the rolls as the machine and counter-rotating rolls move along the corn row. As shown in FIG. 1, the bar arrangement 20a, 20 employs a lesser frequency of bars 20a at the bottom of ends 18 of the rolls and bars 20a are of less height at the bottom of the roll. The stalks are carried through and upwardly of the rolls until they approach the region of the bars 20, as shown in FIG. 1. During the passage from the lower to the upper region, the feeding of the stalks through the roll has become more positive as the frequency and height of the bars 20 has increased. Because of the location of each bar opposite the open side 22 of the corresponding snapping pocket 24 the stalk material is positively pulled between the rolls to assure a positive pull of the stalk and the shank of the ear is held by the bar 20 in the snapping pocket 24 and such positive pull of the stalk and ear shank away from the ear assists greatly in a positive snapping of the ear from the stalk by the lobe 27. Furthermore, there is a positive feeding of material by the increase in contacting elements afforded by the bars 20, very effectively positioned as regards the pattern of the ribs 16 with their open side snapping pockets.

The preferred location of the bars 20, 20a is within the 90 degree quadrant in the direction of rotation ahead of the bottom 25 of each pocket 24. That is, each bar is located opposite the open side 22 of the corresponding pocket and within the 90 degree quadrant ahead of the bottom 25 and preferably between 80 and 90 degrees ahead of the bottom 25 of the pocket.

It is intended that some changes may be made in the construction and arrangement of the parts of the snapping bars without departing from the fundamental principles and purpose of the invention, and it is the intention that the invention shall not be limited by the above specific description of a mechanism found practical in actual operation, but mechanical equivalents of structures which may reasonably be substituted are intended within the scope of the following claims.

I claim:
1. In a corn picker snapping roll assembly of the type having a pair of adjacent counter-rotating snapping rolls, each having a substantially cylindrical body portion with a spirally arranged radially projecting spiral rib pattern extending in convolutions positioned in spiral formation around the cylindrical surface of each roll but with an intervening spiral cylindrical surface extending between said spiral rib pattern convolutions on which no rib pattern is provided, the spiral rib patterns on said adjacent counter-rotating rolls being so positioned relative to each other that the spiral rib pattern on one roll counter rotates adjacent the intervening spiral cylindrical surface between spiral rib pattern convolutions of the opposite roll, said radially projecting spiral rib pattern on each roll comprising a plurality of snapping pockets of substantially U-shaped form having the open sides thereof extending toward the direction of rotation of the roll, the combination therewith of:
a plurality of radially projecting snapping bars formed in and confined within the spiral convolutions of the rib pattern of each roll with one said bar located adjacent and in front of the open side of each of a plurality of said snapping pockets and positioned in a longitudinal direction relative to the axis of the roll and with each said snapping bar extending crosswise and adjacent the open side of such adjacent U-shaped snapping pocket but of such length as not to extend into the adjacent intervening spiral cylindrical surface between said rib pattern convolutions.

2. In a corn picker snapping roll assembly as in claim 1 in which the provision of a snapping bar located adjacent a snapping pocket is of greater frequency in the upper portion of said roll than in the lower portion of said roll.

3. In a corn picker snapping roll assembly as in claim 1 in which said snapping bars are of lesser projecting radial height than the height of adjacent rib pattern and snapping pockets.

4. In a corn picker snapping roll assembly as in claim 1 in which the radial height of said snapping bars near the lower end of said roll is less than the height of said bars in the upper portion of said roll.

5. In a corn picker snapping roll assembly as in claim 1 in which each projecting snapping bar adjacent a snapping pocket is positioned within the 90 degree quadrant from the bottom of said snapping pocket toward the direction of rotation of said roll.

References Cited in the file of this patent
UNITED STATES PATENTS

| | | |
|---|---|---|
| 1,226,719 | Stone | May 22, 1917 |
| 2,315,950 | Fitzloff | Apr. 6, 1943 |
| 2,728,183 | Ratmeyer | Dec. 27, 1955 |
| 2,751,743 | Bauer | June 26, 1956 |